L. P. GASTON.
BRAKE FOR DUMP CARS.
APPLICATION FILED SEPT. 9, 1909.
942,320.
Patented Dec. 7, 1909.
2 SHEETS—SHEET 2.
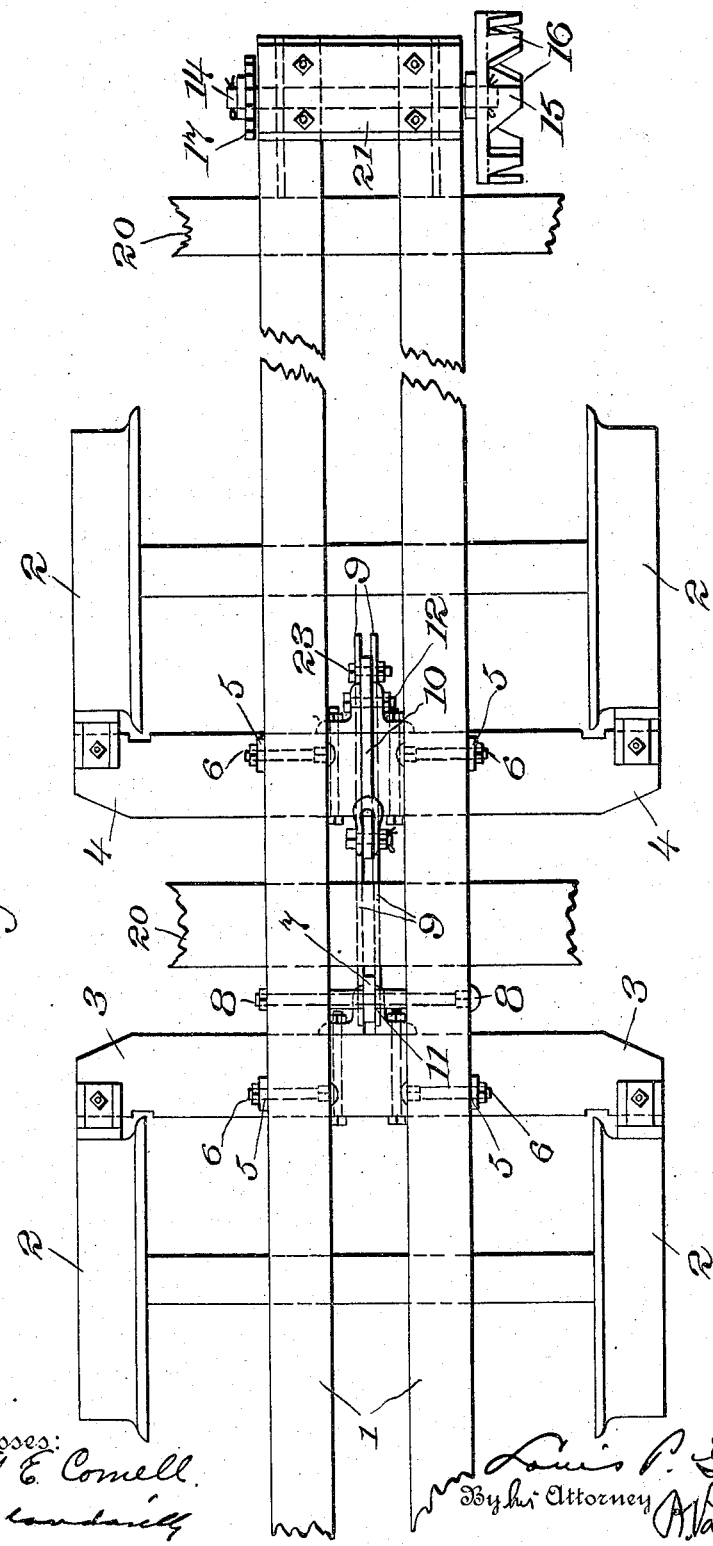

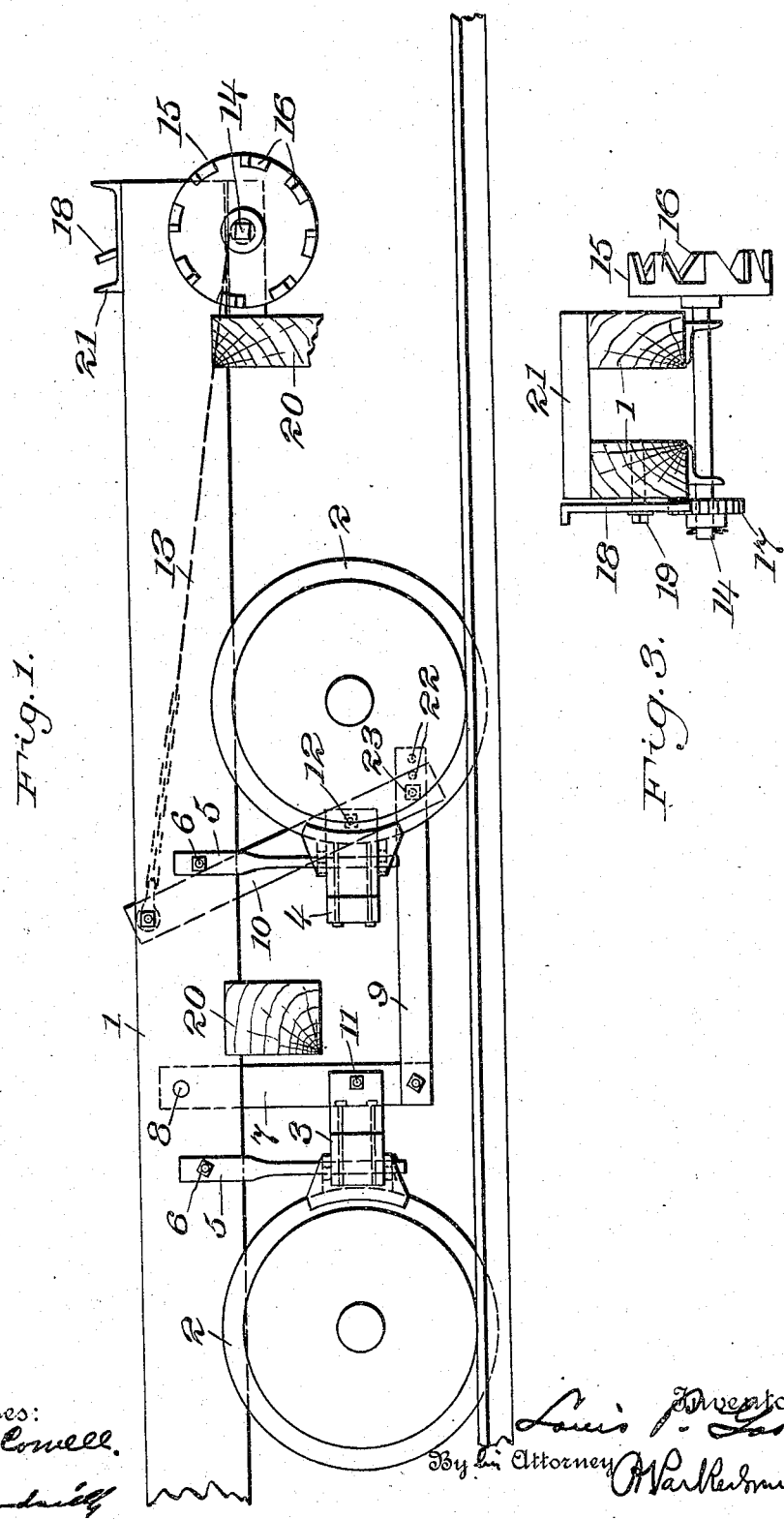

UNITED STATES PATENT OFFICE.

LOUIS PREVOST GASTON, OF SOMERVILLE, NEW JERSEY.

BRAKE FOR DUMP-CARS.

942,320.  Specification of Letters Patent.  Patented Dec. 7, 1909.

Application filed September 9, 1909.  Serial No. 516,879.

*To all whom it may concern:*

Be it known that I, LOUIS P. GASTON, a citizen of the United States of America, residing at Somerville, Somerset county, State of New Jersey, have invented certain new and useful Improvements in Brakes for Dump-Cars, of which the following is a specification.

My invention relates to brake apparatus for dump cars in general, and more specifically consists of certain improved brake apparatus for use on dump cars of the class illustrated in my U. S. Patent No. 925,087, granted June 15, 1909. In cars of this type the ordinary vertically arranged, revolving spindle with hand wheel on top of it, for use in applying the brakes by hand, is objectionable because it sticks up beside the swinging body of the dump car, and is apt to be struck by flying objects and bent when the car is dumped; the standing room for the brakeman is so limited that he can not apply his strength to advantage in twisting the hand wheel, and is in a perilous position; the apparatus is in the way of the man who trips and dumps the car, and it also makes the position of the brakemen so insecure that they often fall off the car when the train is in motion. I have overcome these difficulties by dispensing with the hand wheel and substituting therefor a convenient foot operated wheel, together with proper coöperating mechanism.

The best form of apparatus at present known to me, embodying my invention, is illustrated in the accompanying two sheets of drawing in which—

Figure 1 is a side elevation of a portion of a car with parts broken away, and my invention applied thereto. Fig. 2 is a plan view of the same, and Fig. 3 is a detail end elevation of a portion of the car frame.

Throughout the drawings like reference numbers indicate like parts.

1 is the central supporting frame composed of two longitudinal beams or sills held together by cross beams 20, 20, the whole being supported from the wheels 2, 2, in any convenient manner (not shown).

3 is the left hand brake beam shown in the drawing, and 4 the right hand one. These are supported by pivoted hangers 5, 5, or in any other convenient manner. As shown, the hangers 5, 5, are pivoted at 6, 6, to the main frame. 7 is the dead lever pivoted on the main frame at 8. A bottom rod 9 is formed of two bars arranged one on each side of the brake levers, and 10 is the live lever. The bottom rod has a series of holes 22, 22, into any one of which the live lever 10 can be pivoted by bolt 23. The dead lever 7 is pivoted to brake beam 3 at 11, and the live lever 10 is pivoted to brake beam 4 at 12. A chain 13 or other flexible connection extends from the upper end of live lever 10 to the horizontally disposed shaft or spindle 14 journaled on the under side of the central frame 1 near one end. This revoluble spindle carries the crown wheel 15 having teeth 16, 16, suitably spaced to permit the placing of a man's foot between them. On the other end of spindle 14, is any suitable locking device such as ratchet wheel 17 coöperating with pawl 18, pivoted on the frame at 19, and preferably having its tail extending above the level of the foot plate 21.

In operation, the live lever 10, being inclined inwardly toward the dead lever 7, tends to fall toward it until it rests on one of the cross beams 20, and so, in spite of the drag of chain 13, the live lever falls toward the dead lever when brakes are released, and pulls the dead lever toward it also, thus clearing the brake shoes from the wheels. The operator stands on the foot plate 21, and can hold on firmly to the body of the dump car (not shown). When he desires to apply the brakes he can do so by placing one foot on one of the teeth 16 of crown wheel 15 and kicking the wheel around until the brake rigging is under tension, and the brakes set, after which he can rest his whole weight on one of the teeth and apply full brake pressure. When brakes are to be released, he kicks the tail of pawl 18, freeing the pawl from the ratchet wheel, and the spindle revolves in the opposite direction under the elastic pull of the brake rigging and the weight of live lever 10. When the brake shoes are worn so that slack must be taken up, the bolt 23 is removed, the live lever shifted and pivoted to the bottom rod at another hole nearer the end.

The advantages of my invention comprise its simplicity, compactness and convenient location, being all below the top of the frame 1, and leaving free access to the swinging body and connections, or whatever else is above the frame; the added efficiency of brakes resulting from the ability of the brakeman to put his full weight on the foot wheel; freedom of access to the dumping apparatus and the avoidance of accidents by leaving both hands of the brakeman free to hold on to the car body as it lurches along over the uneven temporary tracks on which cars of this kind are frequently operated.

Having, therefore, described my invention, I claim:

1. The combination with the car frame, supporting wheels and brake rigging therefor, of a revoluble spindle, means for rotating said spindle by foot power, and a flexible connection from the live lever of said brake rigging to the spindle.

2. The combination with a narrow supporting frame for a car, supporting wheels and brake rigging therefor, of a horizontal revoluble spindle journaled on said frame, a chain connected to said spindle and to the live lever of the brake rigging, and a foot operated wheel on said spindle.

3. The combination with a narrow supporting frame for a car, supporting wheels and brake rigging therefor, of a horizontal revoluble spindle journaled on said frame, a chain connected to said spindle and to the live lever of the brake rigging, and a foot operated wheel on said spindle located on one side of the frame, together with a pawl and ratchet mechanism for the spindle also mounted on the frame.

4. The combination with a narrow supporting frame for a car, supporting wheels and brake rigging therefor, of a horizontal revoluble spindle journaled on said frame, a chain connected to said spindle and to the live lever of the brake rigging, and a foot operated wheel on said spindle located on one side of the frame, together with a pawl and ratchet mechanism for the spindle also mounted on the frame, the tail of the pawl projecting above the top of the frame.

5. The combination with the car frame, supporting wheels and brake rigging therefor, of a revoluble spindle, means for rotating said spindle by foot power, and a flexible connection from the live lever of said brake rigging to the spindle, together with foot controlled locking means for said spindle.

6. In a brake rigging the combination with the supporting frame, bottom rod and brake beams, of a dead lever normally suspended in an approximately perpendicular position and a live lever normally inclined so that its upper end is nearer the dead lever than is its lower end, a spindle journaled on the frame, foot operated means for rotating said spindle, and a chain connection from said spindle to the upper end of the live lever.

LOUIS PREVOST GASTON.

Witnesses:
G. E. CORNELL,
G. E. MANDARILL.